United States Patent [19]
Beeck

[11] Patent Number: 5,827,045
[45] Date of Patent: Oct. 27, 1998

[54] THERMALLY LOADED BLADE FOR A TURBOMACHINE

[75] Inventor: Alexander Beeck, Endingen, Switzerland

[73] Assignee: Asea Brown Boveri AG, Baden, Germany

[21] Appl. No.: 828,541

[22] Filed: Mar. 31, 1997

[30] Foreign Application Priority Data

May 2, 1996 [DE] Germany .................. 196 17 556.9

[51] Int. Cl.⁶ ................................................ F01D 5/18
[52] U.S. Cl. .................. 416/96 A; 416/97 R; 416/224; 416/241 B
[58] Field of Search ................... 415/115, 116, 415/134, 135, 200; 116/96 R, 96 A, 97 R, 224, 241 B

[56] References Cited

U.S. PATENT DOCUMENTS

| | | | |
|---|---|---|---|
| 3,619,077 | 11/1971 | Wile | 415/115 |
| 4,461,612 | 7/1984 | Dodd | 416/96 A |
| 4,565,490 | 1/1986 | Rice | 415/115 |
| 4,728,262 | 3/1988 | Marshall . | |
| 4,786,234 | 11/1988 | Readnour | 416/97 R |
| 4,897,020 | 1/1990 | Tonks | 415/115 |
| 5,090,866 | 2/1992 | Blair | 415/115 |

FOREIGN PATENT DOCUMENTS

| | | | |
|---|---|---|---|
| 3821005A1 | 12/1989 | Germany . | |
| 58-47103 | 3/1983 | Japan | 416/97 R |
| 59-215905 | 5/1984 | Japan | 416/224 |
| 1530256 | 10/1978 | United Kingdom | 416/97 R |
| 2202907 | 10/1988 | United Kingdom | 416/96 R |

OTHER PUBLICATIONS

Japanese Patent Abstract for 59–215, 905, dated Dec. 1984.

*Primary Examiner*—Christopher Verdier
*Attorney, Agent, or Firm*—Burns, Doane, Swecker & Mathis, L.L.P.

[57] ABSTRACT

In a thermally loaded blade for a turbomachine, the front edge of such a blade is made from a ceramic material for providing better protection. The front edge has a shell-shaped form which covers at least one part of the head stage against which flow occurs. The connection between front edge and head stage is produced on the one side by a coupling-forming indentation and on the other side by an elastic element. The elastic element produces a retaining action at the location where it is placed and a frictional connection, having an effect on the indentation, on the other side of the blade. Cooling air bores in the head stage provide for a cooling effect on the ceramic front edge.

13 Claims, 2 Drawing Sheets

THERMALLY LOADED BLADE FOR A TURBOMACHINE

BACKGROUND OF THE INVENTION

1. Field of the Invention

The present invention relates to a thermally loaded blade for a turbomachine.

2. Discussion of Background

The demand for high efficiencies in a turbine leads in addition to a high pressure ratio to ever higher turbine inlet temperatures. However, the blade materials available today for such turbines only tolerate these temperatures with appropriately effective cooling. The cooling air required for this is diverted from the combustion-air flow and therefore does not participate in the energy supply in the combustion chamber, a factor which leads to a reduction in the efficiency of the power station plant.

In order to save cooling air, many tests are presently being carried out to protect the turbine blades with a ceramic coating or even to produce the entire blade from a ceramic material. In the case of a ceramic coating, there is generally a risk of the structure bursting open, in particular when work has to be carried out with thicker coatings, 0.5–1.5 mm. On the other hand, if thinner ceramic coatings are provided, they have to be cooled by a cooling-air film, a fact which is inconsistent with the actual task of a heat-insulating layer. Large all-ceramic blades are at present still unable to withstand for a sufficiently long operating period the forces and stresses which occur.

SUMMARY OF THE INVENTION

Accordingly, one object of the invention, as defined in the claims, in the case of a blade of the type mentioned at the beginning, is to provide novel measures which afford the blades a sufficiently large degree of thermal protection without discharging cooling air.

According to the invention, the front edge of the blades is made from a ceramic material, whereas the rest of the blade can be designed in a conventional manner. This has the following advantages:

a) The front edge of each turbine blade is of smaller geometric size. Accordingly, small ceramic components are involved, which are actually less problematic with regard to the abovementioned ceramic problems.

b) The forces of the blades and on the blades are absorbed in a conventional manner by the metal part of the same; the ceramic material merely bears the load from the temperature gradient and to a smaller degree from the aerodynamic forces which occur.

c) The front edge of the blade can be designed so as to be suitable for ceramics, i.e. generous radii, uniform wall thicknesses, favorable temperature gradients and sufficiently large bearing surface are provided.

The effects of this are a considerable improvement in efficiency, in particular at the first turbine guide rows, an improvement in the aerodynamics, and considerable saving of cooling air.

Advantageous and expedient further developments of the achievement of the object according to the invention are defined in the further claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
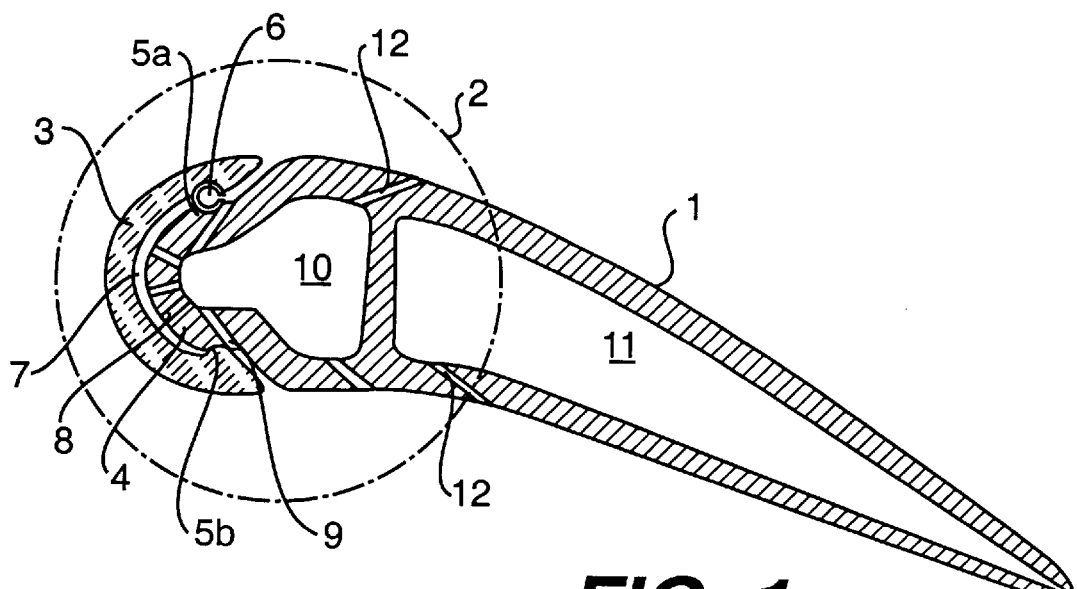
FIG. 1 shows a cross-sectional view of a turbine blade with a ceramic front edge.

Referring now to the drawings, wherein like reference numerals designate identical or corresponding parts throughout the several views and all elements not directly required for understanding the invention have been omitted, FIG. 1 shows a turbine blade 1 as normally used in gas turbines. This turbine blade has relatively large cooling passages on the inside through which a cooling medium flows. A first cooling-air passage 10 for the front-edge section 2 and a further cooling-air passage 11 for the rear section of the blade 1 are apparent. The front-edge section 2 of this blade 1 made of a high-grade metal is drawn in in order to provide space for applying a shell-shaped front edge 3 made of a high-grade ceramic material and referred to below in short as ceramic front edge. The blade 1 and ceramic front edge 3 are preferably connected to one another via means which are able to produce a frictional connection and/or positive-locking connection between the two in the coupled state. For this purpose, the head stage 4 of the blade 1 in this case has one indentation 5a, 5b each on both the suction side and the pressure side, which indentation 5a, 5b enables the ceramic front edge 3 to be hung mechanically on the metallic head stage 4 of the blade 1. The frictional connection required for anchoring is produced on the one side, for example at the indentation 5a, with at least one spring element 6, the latter preferably having a cylindrical configuration. The ceramic front edge 3 is first of all hung along the indentations 5a, 5b and then anchored by pushing in the spring element 6 radially. The ceramic front edge 3 therefore bears on two lines and can move freely in a thermal manner against the spring element 6 within a certain degree of freedom. A gap 7 between the head stage 4 and the inside of the ceramic front edge 3 serves as insulation, since there is an air cushion here which in addition is cooled by leakage at the said lines. The gap 7 is supplied by a type of showerhead cooling (e.g., cooling by several rows of holes), the air throughput being limited to a very small quantity by the linear bearing surface. In principle, the head stage 4 of the blade 1 is designed in such a way that aerodynamics are ensured which, even if they are not optimum, are nonetheless adequate. Furthermore, this head stage 4 is cooled by a number of cooling-air bores 8 in such a way that operation without a ceramic front edge 3 is readily possible for a limited period of time. The ceramic front edge 3 has a wall thickness of typically 3–8 mm. Both the front-edge section 2 and the remaining part of the blade 1 are provided with cooling-air bores 12 which are fed from the cooling-air passages 10 and 11 and which bring about film cooling on the blade surface. In addition, further cooling-air bores 9 are made in the remote region of the head stage 4, which cooling-air bores 9 initiate film cooling between the metal and ceramic section of the blade 1, whereby this awkward section in view of the coupling acting there between the two parts is also cooled in an optimum manner. Apart from conventional ceramics, the use of advanced fiber-reinforced ceramics is also possible, which are far better protected from damaging effects, in particular of a mechanical nature. The shell-shaped configuration of the ceramic front edge 3 is well suited to the design having fiber-reinforced ceramics. In order to understand it better, the front-edge section 2 of the blade 1 is considered again in FIG. 2 to a larger scale and, in so far as necessary, is described further.

Figure 2:
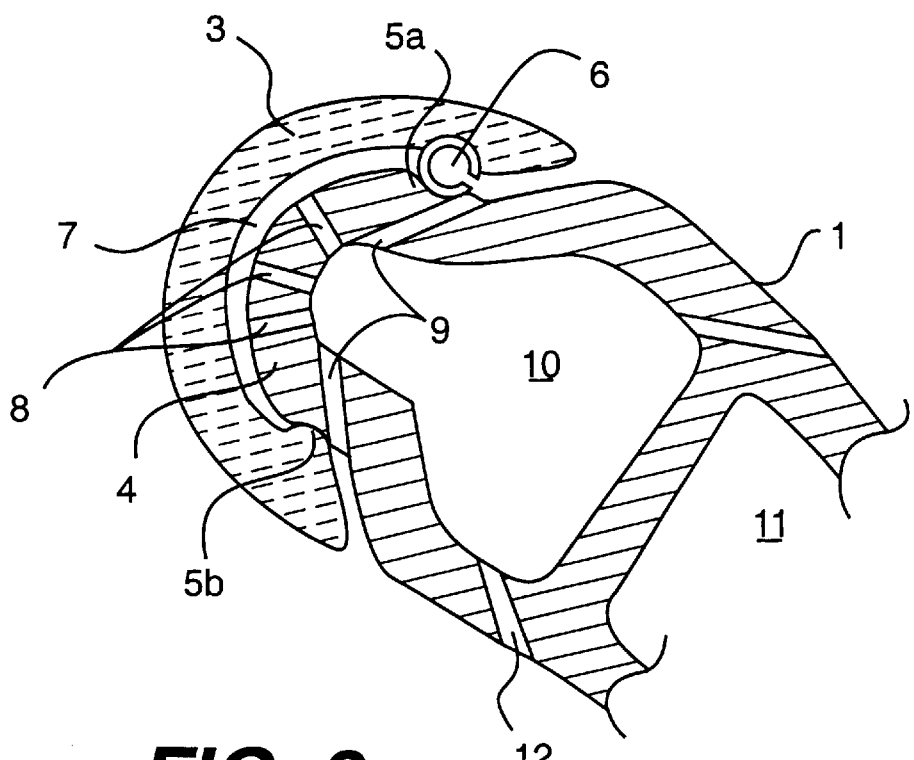
FIG. 2 shows a cross-sectional of the ceramic front-edge section of the turbine blade according to FIG. 1.

FIG. 2 shows the front-edge section 2 of the blade 1, as already largely described under FIG. 1. The construction of the hung ceramic front edge 3 as well as the means 6 and 5a, 5b respectively provided for this for producing the coupling and a frictional connection and/or positive-locking connection between the two parts ¾ are clearly apparent from this figure.

Figure 3:
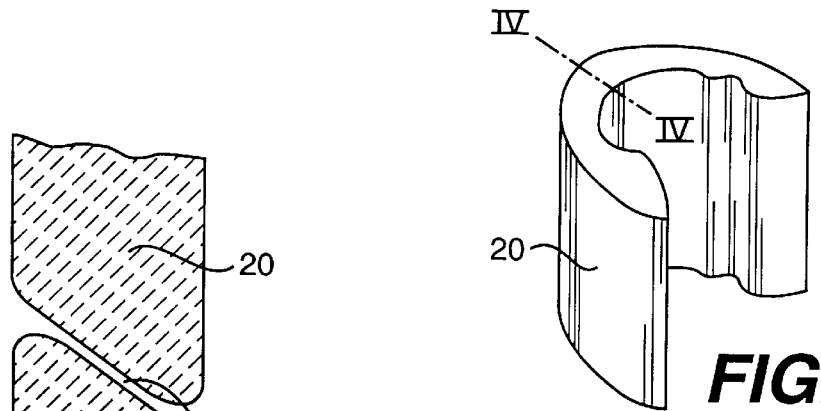
FIG. 3 shows a three-dimensional view of a ceramic front edge.

FIG. 3 shows the ceramic front edge, already described under FIGS. 1 and 2, in a three-dimensional view, which ceramic front edge is itemized here by 20 on account of its specific design. If the radial stresses occurring inside this ceramic front edge 20 in the fitted state should become too great, this can be remedied by the ceramic front edge 20 being split into two or three in the radial direction, in which case special measures then have to be provided at the hanging mechanism for the various parts.

Figure 4:
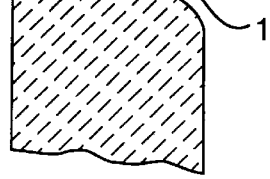
FIG. 4 shows a cross-sectional view of the parting surfaces inside the ceramic front edge.

The division of such a ceramic front edge 20 is apparent from FIG. 4. The parting seams 13 for this run at an angle, on the one hand to increase the sealing length and on the other hand to prevent a direct flow of the hot gases through the parting seams 13 inside the ceramic front edge 20 to the blade head stage arranged underneath. The parting seams may also run perpendicularly in order to simplify production. In principle, the parting seam may be of any configuration.

Figure 5:
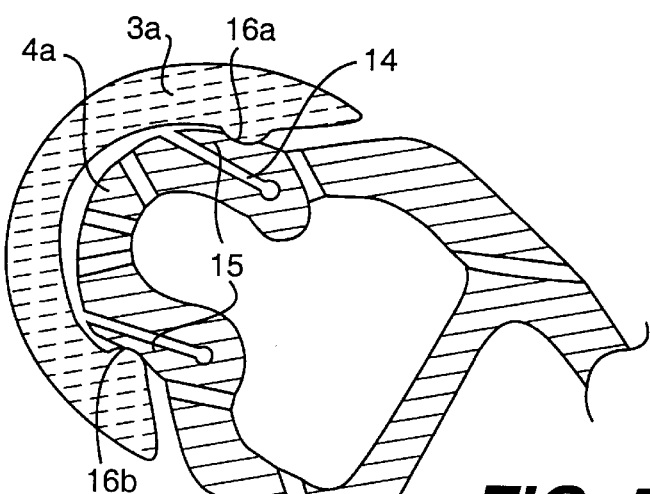
FIG. 5 shows a cross-sectional view of a fastening arrangement of the ceramic front edge.

FIG. 5 shows a further variant of the hanging of the ceramic front edge 3a. Here, the head stage 4a largely corresponds to that from FIG. 2. As far as the hanging of the ceramic front edge 3a is concerned, this head stage 4a has a relatively large indentation 16a, 16b on both sides. In the region of these indentations, slots 14 are eroded, for example, on both sides of the head stage 4a, whereby tongues 15 having elasticity, called spring tongues in short, are obtained which produce the frictional connection between the two parts to be connected. Since a relatively strong spring action has to be provided here in order to compensate for different thermal expansions, the ceramic front edge 3a is to be fitted in the radial direction, since the spring excursion available here is insufficient to push the ceramic front edge 3a from the front over the spring tongues 15. In order to produce the desired spring action, however, only a very small spring excursion is necessary, especially as the latter is distributed over two sides.

Figure 6:
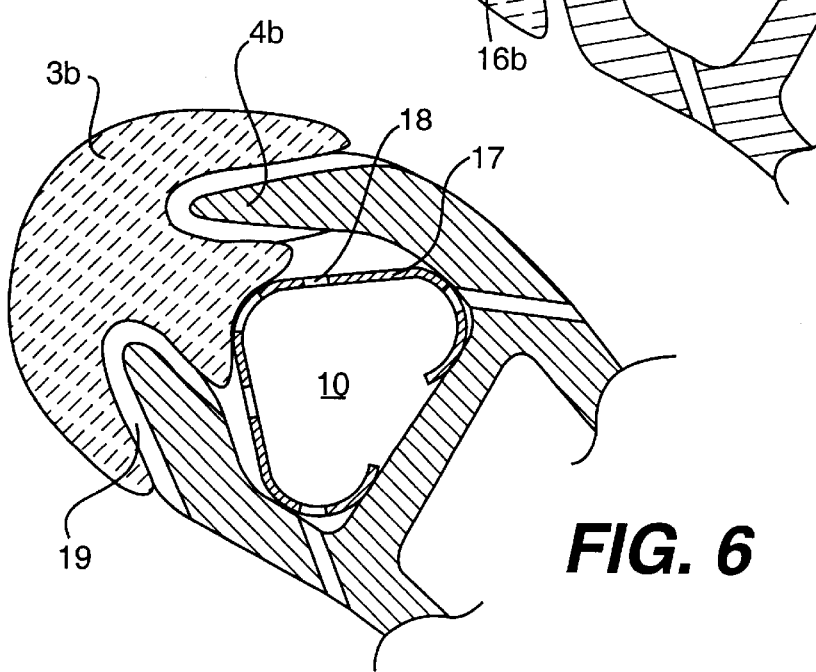
FIG. 6 shows a cross-sectional view of a further fastening arrangement of the ceramic front edge.

FIG. 6 shows a solid ceramic front edge 3b which is provided with a dovetailed root and is likewise fitted radially. To this end, the head stage 4b of this blade has an open recessed front edge, the profile of which corresponds to that of a dovetailed root. Other profiles are of course also possible for this purpose. The ceramic front edge 3 is pressed via its root against the head stage 4b with the aid of an elastic metal insert 17 which is embedded in the front cooling passage 10. The cooling air flowing through this passage 10 is directed with the aid of corresponding openings 18 through the metal insert 17 and finally continues to flow along grooves 19 which are integrally cast in the head stage 4b and which follow the inner shape of the ceramic front edge 3b, as a result of which a sufficiently large cooling area of the ceramic material at the metal part is ensured. The elastic metal insert 17 is conceived in such a way that, if the ceramic front edge 3b is missing, it settles on the opening formed by the head stage 4b in such a way that adequate aerodynamics are ensured in this region. Cooling of the head stage 4b is likewise ensured, which takes place via the said openings 18.

In all solutions proposed, the pressure difference between the cooling air and the hot gas flowing here also helps to apply the pressure against the respective ceramic front edge in a defined manner. The solutions also have a configuration suitable for ceramics, since, on the one hand, there are largely only compressive stresses on the ceramic front edge in the stationary state due to the temperature gradients present. In the solutions which use stress produced by springs, care must be taken to ensure that the minimum spring force required for this is not lost in the transient load ranges and that no damaging tensile stresses develop on the ceramic materials. The elasticity will preferably always be provided where adequate cooling of the spring elements is ensured. In principle, by attaching ceramic parts, similar solutions are also possible for the rear edges of the blade, which are likewise subjected to high thermal loading.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by letters patent of United States is:

1. A thermally loaded blade for a turbomachine, said blade comprising:

a rear section;

a front section including a head stage against which flow occurs and a front edge made from a ceramic materials; and elastic means for forming a frictional connection between at least one part of the head stage and said front edge, said elastic means providing both a rigid connection capable of withstanding turbine forces and a flexible contact capable of accommodating different thermal expansions of said front edge and said blade.

2. The blade as claimed in claim 1, wherein the front edge made from a ceramic material has a shell-shaped form.

3. The blade as claimed in claim 1, wherein the front edge made from a ceramic material has a coupling-forming, dovetailed root.

4. The blade as claimed in claim 3, wherein said elastic means includes an elastic metal insert within the head stage, said insert cooperating with the dovetailed root to connect the front edge to the head stage.

5. The blade as claimed in claim 1, wherein there is an air gap between the under surface of the front edge made from a ceramic material and an end face of the head stage, and wherein cooling air from a cooling-air passage of the blade can flow against the air gap.

6. The blade as claimed in claim 1, wherein the elastic means for forming a frictional connection includes elastic elements.

7. The blade as claimed in claim 1, wherein the front edge made from a ceramic material is split in a radial direction relative to the head stage by at least one parting seam.

8. The blade as claimed in claim 1, wherein the head stage of the blade has an aerodynamic configuration on its own or in interaction with an elastic element.

9. The blade as claimed in claim 1, wherein said head stage includes cooling means for providing cooling air between said head stage and said front edge.

10. The blade as claimed in claim 9, wherein said elastic means includes at least one indentation formed in the head stage and a spring element.

11. The blade as claimed in claim 9, wherein said elastic means includes spring tongues formed in the head stage, the front edge being connected to the head stage by the spring tongues.

12. The blade as claimed in claim 1, wherein said elastic means includes at least one indentation formed in the head stage and a spring element.

13. The blade as claimed in claim 1, wherein said elastic means includes spring tongues formed in the head stage, the front edge being connected to the head stage by the spring tongues.

* * * * *